(12) United States Patent
Calltharp (10) Patent No.: US 6,884,354 B1
(45) Date of Patent: Apr. 26, 2005

(54) SYSTEM AND PROCESS FOR THE TREATMENT OF WASTEWATER

(76) Inventor: Glen R. Calltharp, 2202 Gold Oak La., Sarasota, FL (US) 34232

( * ) Notice: Subject to any disclaimer, the term of this patent is extended or adjusted under 35 U.S.C. 154(b) by 149 days.

(21) Appl. No.: 10/462,296

(22) Filed: Jun. 16, 2003

(51) Int. Cl.$^7$ .................................................. C02F 3/00
(52) U.S. Cl. ........................ 210/620; 210/631; 210/739; 210/820; 210/98; 210/102; 210/138; 210/143; 210/151; 210/220; 210/252
(58) Field of Search .................................. 210/620, 631, 210/739, 800, 98, 102, 138, 143, 151, 220, 252

(56) References Cited

U.S. PATENT DOCUMENTS

4,596,658 A    6/1986    Mandt

*Primary Examiner*—Chester T. Barry
(74) *Attorney, Agent, or Firm*—Charles J. Prescott (57) ABSTRACT

A system and process for the treatment of wastewater in a series of sequencing batch reactor basins wherein wastewater is sequentially fed, treated and discharged on a continuous basis.

4 Claims, 10 Drawing Sheets

SYSTEM AND PROCESS FOR THE TREATMENT OF WASTEWATER

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates generally to a system and process for the treatment of wastewater and, in particular, to such a system and process utilizing sequencing batch reactors.

2. Description of Related Art

In the early history of wastewater treatment by microorganisms, the wastewater was often batched and treated by various processes of agitation, aeration or the like. With the amount of wastewater to be treated increasing in volume and in impurities, batch treatment became fairly labor intensive and was eventually substantially replaced by continuous wastewater treatment processes in the 1920's and 1930's.

However, with the relatively recent innovation of computers which can be programmed to control valves, motors, etc. in the wastewater treatment process system, batch reactors and other periodic processes again appear to be a viable alternative and offer attractive advantages over continuous processes.

A sequencing batch reactor system generally incorporates a series of batch reactors, usually two or more, which use a sequence of steps to treat wastewater. Each of these reactors retains a certain amount of activated sludge and allows for the removal of excess sludge. The activated sludge contains microorganisms, which assist in the breakdown of waste materials when provided with adequate oxygen levels.

Each reactor in a conventional sequencing batch reactor system operates in a cyclical process. During the cycle for each particular reactor, the reactor must complete the process of treating a batch of wastewater. The batch wastewater treatment process includes a fill period, a react period, a settle or quiescent period and a decant period. An idle period may also be included in the treatment process.

In a conventional sequencing batch reactor (SBR) process, during the fill period, wastewater is introduced into a batch reactor and the wastewater level in the filling reactor rises. The fill period can be further divided into an anoxic fill period and an aerated fill period. During the anoxic fill period, wastewater is introduced into the batch reactor without aeration, and during aerated fill, the wastewater already introduced into the batch is aerated while the reactor continues to fill, thereby providing oxygen to the microorganisms in the activated sludge.

At the end of the fill period, incoming wastewater is diverted to another batch reactor, which then begins its cycle. The just filled reactor then enters the react period wherein the wastewater contained in the reactor is aerated for a predetermined time period, or until the desired level of treatment is attained. Aeration of the contents of the batch reactor results in the mixing of the activated sludge and the wastewater as well as the introduction of oxygen into this mixture. The introduction of oxygen into the mixed wastewater and sludge is required by the microorganisms contained in the sludge to effect the decomposition of various wastewater components, including biodegradable organic matter.

At the end of the predetermined aeration period, the system enters a settle period where quiescent conditions are maintained. These quiescent conditions allow the reactor contents to separate into a clarified effluent upper layer and a lower sludge layer. After separation is complete, the sludge layer rests on the bottom of the reactor and the clarified effluent layer is located above the sludge layer. The effluent layer is subdivided into a lower buffer volume and an upper decant volume.

In a conventional sequencing batch reactor, at the end of the settle period, the decant period begins and the decant volume of the clarified effluent is removed from the reactor. The wastewater level in the decanting reactor falls. The decant volume is normally equal to the volume of influent received during the previous fill period. However, the decant volume and, therefore, the fill volume are limited to a maximum volume based on the dimensions of the reactor. The buffer volume is retained in the reactor during the decant period and provides a buffer zone between the sludge layer and the decant volume to reduce the possibility of sludge uptake during the decanting process.

At the end of the decant period, the reactor typically enters an idle period until each reactor of the system has sequenced through the filling cycle after which influent wastewater is directed back to that reactor and the reactor begins its cycle again with the fill period. The length of certain of these steps has been varied for various reasons and, in particular, to respond to varying influent flow rates.

The sequencing batch reactor process has gained wide popularity due to its unique ability to meet a wide range of advanced treatment standards. In a conventional sequencing batch reactor process, the anoxic time segments inhibit the growth of obligate aerobes (microorganisms that require the presence of free oxygen), including most filamentous microorganisms that do not settle well. The presence of poor settling filamentous microorganisms in the final effluent adversely affects effluent quality. Further, certain microorganisms present in the biomass will utilize the combined oxygen available in nitrates in the intermediate buffer volume of treated wastewater remaining in the reactor after each cycle to uptake soluble carbon in the incoming wastewater under anoxic conditions. These microorganisms convert the soluble carbon and nitrates ($NO_3$—) to energy, nitrogen gas ($N_2$), water, and carbon dioxide ($CO_2$). This reaction is referred to as denitrification, and is required in many treatment facilities discharging to wetlands, or sensitive streams.

True sequencing batch reactor processes also include a react period. In this aerobic cycle segment, no wastewater is received in the reactor, and the mixed liquor is aerated to fully degrade all carbonaceous waste material in the reactor. This step in the operating cycle creates a "famine" condition in the reactor. Simply stated, there is no food remaining for the microorganisms. This "famine" period inhibits the growth of fast growing microorganisms, including filaments, which adversely affect effluent quality.

True sequencing batch reactor processes also include a quiescent settling period during which no influent is received and no effluent is withdrawn. The presence of a quiescent settle period improves liquid solid separation, and thus, effluent quality.

Based on the maximum cycle time, the conventional operating strategy is time based with level overrides. Timers are set for the fill period, the anoxic fill period, the aeration period (aerated fill period plus aerated react period) and the settle period. The fill timer is set for a period equal to the maximum cycle time divided by the number of reactors. For example, in a two reactor system having a six hour maximum cycle time, the fill timer for each reactor would be set at three hours. The influent flow rate required to fill the reactor or, more specifically, the maximum decant volume within the time set on the fill timer, is the design flow rate. The maximum cycle time is generally picked so that the reactor operates a majority of the time at flow rates near or below the design flow rate.

In conventional batch reactor systems the batch volume is generally between 20% and 40% of the reactor's total volume, or depth. This results in a necessary total hydraulic differential through the reactor basins equal to the difference between the maximum mixed liquor level and the minimum mixed liquor level in a reactor.

In conventional batch reactor systems, the varying liquid level in the reactor basins requires that dedicated piping be used to convey compressed air from an air blower system to the air diffusion devices in the reactor basins. Alternately, a complex pressure control system may be used to maintain a constant pressure against which the air blowers pump to prevent air from flowing to an undesired reactor due to a lower liquid level, and hence less back pressure in this reactor.

In conventional batch reactor systems, extremely high influent flows cause periods of simultaneous fill and decant. Since the liquid level must fall from maximum level to minimum level during the decant period, the decant flow rate is generally approximately one and one half time the maximum influent flow rate. Downstream process equipment such as disinfection or filtering systems must be sized to handle these extremely high decant flow rates.

At flow rates above the design flow rate, the time available for the non-filling reactors to go through the various treatment steps becomes a limiting factor in the wastewater treatment strategy. As the influent flow rate increases, the fill time decreases, thereby decreasing the time available for the non-filling reactor(s) to complete all the treatment steps.

Because the time required for the settle period and the decant period is generally constant for full batches and the fill period is determined by the influent flow rate, conventional operating strategies generally compensate for the narrowing time constraints by reducing the idle period until it becomes zero, and then start to reduce the react period. The react period can be initially reduced without reducing the overall aeration time by providing for a longer aerated fill period, although this does reduce anoxic treatment time. Then, as the time constraints narrow, the aerated fill period is continually increased and the react period is decreased. This will reduce the anoxic fill period while maintaining a constant aeration time. Eventually, the react period is eliminated and all of the aeration takes place during the fill period. The anoxic fill period is consequently eliminated. Elimination of the anoxic fill period and the react period (as opposed to an aerobic fill period) is undesirable. Each of these steps is important for the effective decomposition of waste material by microorganisms contained in activated sludge.

BRIEF SUMMARY OF THE INVENTION

The present invention provides a process and system for the treatment of wastewater in a sequencing batch reactor system and a computer control system used to implement the operating process. The wastewater treatment process of the present invention establishes a maximum cycle time as in conventional operating; however, the various steps or stages of the operating cycle of the wastewater treatment process are not varied in a conventional manner so as to provide significantly improved results over conventional processes.

The liquid level in all of the process reactors remains substantially constant at all times. As a reactor sequentially receives influent flow, it is distributed at very low velocity near the bottom of the reactor; a decanting mechanism in the filling reactor is simultaneously activated, allowing the influent to displace an equal amount of treated effluent comprising the upper clarified layer. After a predetermined anoxic fill/decant period, the influent flow is diverted to the next reactor in sequence. The decant mechanism in the just filled reactor is deenergized, and the just filled reactor is aerated for a true react period. Aeration is continued for a predetermined time period, usually up to 50% of the total operating cycle, or until biodegradation is completed.

After the react cycle segment, all mixing and aeration is ceased, and the reactor is allowed to settle under quiescent conditions. The reactor remains in the settle mode until the process controller calls for the reactor to begin a new cycle. Near the end of the quiescent settle period, when necessary, a sludge wasting mechanism is activated to discharge excess activated sludge.

It is therefore an object of this invention to provide a system and process for the treatment of wastewater which maintains a substantially constant level within each batch reactor at all times.

It is further an object of this invention to provide such a system and process which optimizes the aeration time period.

It is another object of this invention to provide such a system and process which maintains the incorporation of true react cycle segment under all system flow conditions.

It is still another object of this invention to provide such a system and process which maintains the incorporation of an anoxic fill cycle segment in all operating cycles, under all flow conditions.

Yet another object of this invention is to provide such a system and process which maintains the incorporation of a quiescent settle cycle segment in all operating cycles, under all flow conditions.

Another object of this invention is to provide such a system and process from which treated effluent is continuously discharged at a rate equal to the influent flow rate.

Another object of this invention to provide such a system and process which is easily adaptable to be wholly or partially automated and, in particular, is adapted to computer control.

Yet another object of this invention is to provide a computer which controls such a system and process and to provide such a system and process which is readily incorporated into sequence batch reactors (SBRs) and is particularly suited for the intended usage thereof.

In accordance with these and other objects which will become apparent hereinafter, the instant invention will now be described with reference to the accompanying drawings.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The process of this invention is utilized with a sequencing batch reactor (SBR) system having two or more reactors 30 and 32, as illustrated in FIGS. 1 thru 5. The reference numeral 10 generally represents such a sequencing batch reactor system. The system 10 includes two or more sequencing batch reactor (SBR) basins 30 and 32, an influent distribution manifold 24, a control valve 26 for each influent conduit 12, an influent distribution member 14, an aeration and mixing aerator/mixer 16, and a decanter 18 such as that shown and described in U.S. Pat. No. 4,596,658.

The reactor basins 30 and 32 each hold wastewater 38 to be treated therein. During a treatment cycle, the wastewater 38 inside the basins 30 and 32 will remain at a substantially constant surface water depth (SWD) indicated by the reference numeral 36.

Figure 1:
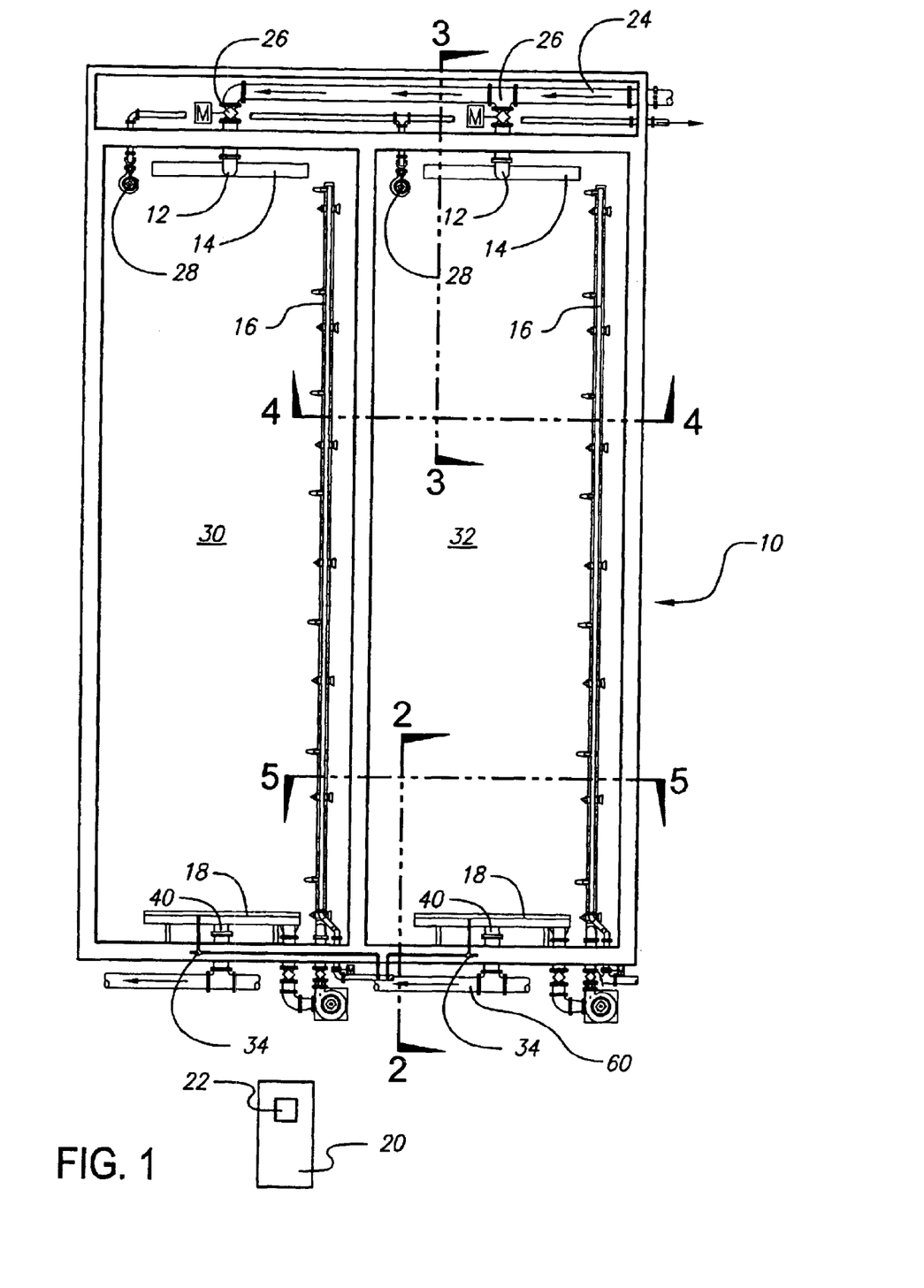
FIG. 1 is a schematic top plan view of sequencing batch reactor basins for performing the process of the invention.
Figure 4:
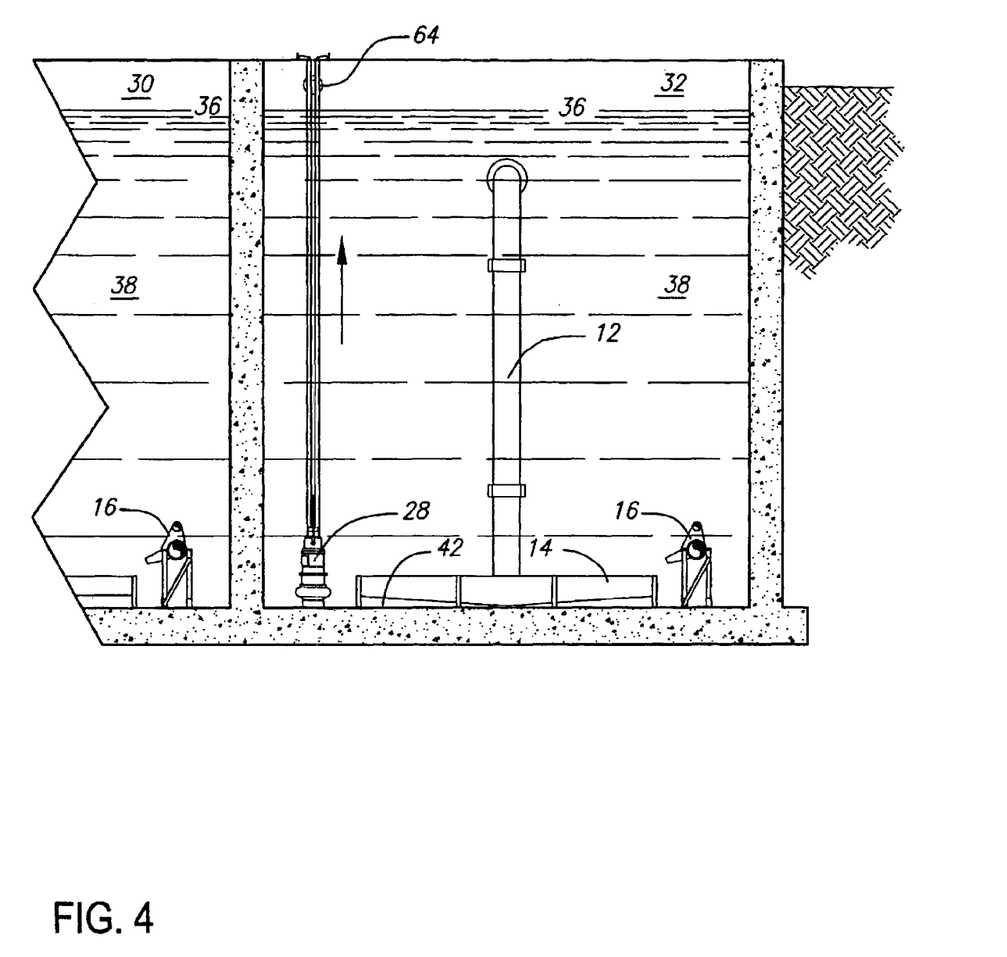
FIG. 4 is an enlarged, fragmentary and partially schematic cross-sectional view of the basin taken along line 4—4 of FIG. 1.

For each reactor basin 30 and 32, wastewater to be treated enters through the influent conduit 12 from manifold 24 as regulated at the influent control valves 26 and is distributed across the bottom of each reactor basin 30 and 32 through a distribution member 14 connected to the lower end of the influent conduit 12 and having one or more distribution apertures 42. Each decanter 18 operates to decant clarified wastewater from the upper layer of each of the sequencing batch reactor basins 30, 32. The decanter 18 is flow connected with a discharge conduit 40, through which decanted wastewater is discharged. When the lower layer of sludge accumulates excessively, a sludge waste removal system 28 as best seen in FIGS. 1 and 4, suctions sludge from adjacent the bottom of each of the reactor basins 30 and 32 for removal therefrom through the sludge disposal conduit 64.

Each sequencing batch reactor system 10 also includes a computer control system 20 including a computer 22. The computer 22 is operatively linked to each of the influent control valves 26 aerator/mixers 16, sludge wasting system 28, and decanter control valves 34. The computer 22 operates each of these elements as required to operate the system in accordance with the present invention.

Cycle Time

Using the reactor basins 30 and 32 wastewater is treated in a cyclical batch process. Each complete cycle preferably includes a (1) fill/decant period, (2) a react period, and (3) a quiescent settle period. To ensure operational efficiency and to maintain healthy microorganism populations in the sludge in the reactor basins 30 and 32, a maximum cycle time is established. The amount of time allowed for the fill/decant period for each reactor basin 30 and 32 operating at the maximum cycle time is the maximum cycle time divided by the number of reactor basins, in this example, two.

The process of the present invention may be controlled either by maximum cycle time or by monitoring dissolved oxygen concentration. When the dissolved oxygen concentration rises rapidly, all food is gone and treatment objectives have been achieved. A general rule for establishing time of cycle is: cycle=24 hours÷((n+2)+(1/n)) (where n=the number of reactor basins) to insure that the daily load is distributed evenly. By this general rule, the cycle time for a 4 basin cycle is: 24 hours÷6.25=3.84 hours=230.4 minutes. The fill cycle time: cycle time÷number of basins; 230.4÷4= 57.6 minutes. Aeration time maximum is half of the total cycle: 230.4/2=115.2 minutes. Settle or quiescent time is a minimum of 45 minutes. Therefore, each timed cycle for 4 basins is: 57.6 minutes of fill/decant, 115.2 minutes aeration and 57.6 minutes settle time.

The total cycle time for 3 basin cycle is: 24÷5.33=4.5 hours=270 minutes. Fill time is: cycle/number of basins; 270÷90 minutes. Aeration time is a maximum of half of total cycle: 270÷2=135 minutes. Settle time is a minimum of 45 minutes. Therefore, the total timed cycle for 3 basins is: 90 minutes of fill/decant, 135 minutes aeration and 45 minutes settle.

Except for very rare occasions, systems will preferably have four basins. Very large systems (over 10 million gallons per day) may have eight basins. In those cases, flow will be split and plant will operate as two four-basin systems.

The computer control system 20 is used to implement this operating strategy. A fill/decant timer, a react timer and a settle timer are programmed into the computer control system 20. The fill/decant timer is set for an amount of time equal to the maximum cycle time divided by the number of reactor basins 30, 32. The react timer may, alternately to the above, be set for the time required to deliver oxygen sufficient for complete biodegradation of the maximum waste materials received during the fill/decant cycle segment, usually 35% to 50% of the total cycle time. The settle timer is set for a constant value based on the required settle or quiescent time.

Fill/Decant Period

Figure 7:
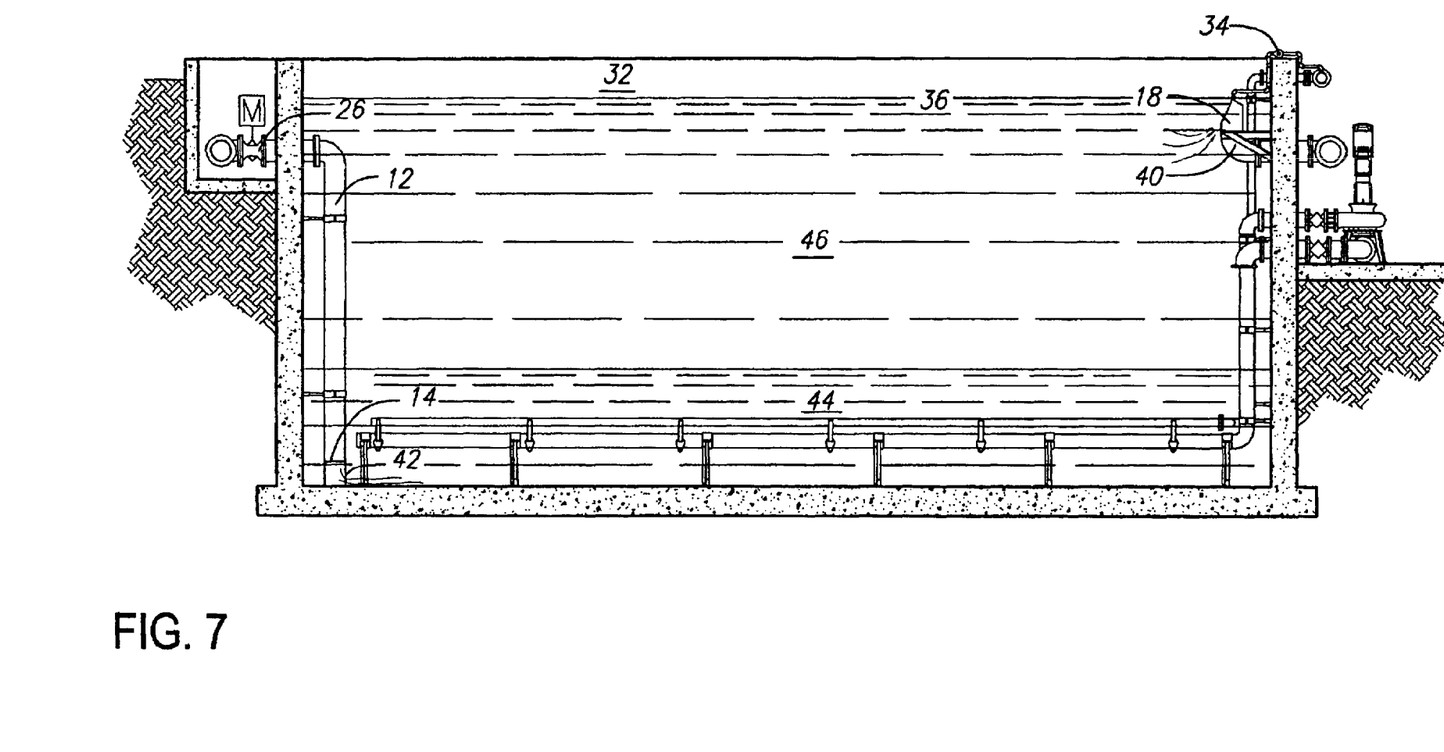
FIGS. 7 thru 9 are fragmentary and partially schematic cross-sectional views of a reactor basin corresponding to process description.

Referring now to FIGS. 7 to 10, at the beginning of a cycle is shown in FIG. 7. A layer of sludge 44 rests on the bottom portion of the reactor basin 32 and an upper layer of clarified effluent and an intermediate buffer zone 46 extend upwardly from the sludge layer 44 to the SWD 36. The fill/decant timer is begun and the computer control system 20 opens the influent control valve 26 allowing wastewater to enter the reactor basin 32 for the fill/decant time period set by the computer 22. Wastewater is introduced into the reactor basin 32 through the distribution apertures 42 of the distribution member 14 connected to the lower end of the influent conduit 12.

Simultaneously, the computer control system 20 activates the decanter control valve 34 stopping pressurized air flow into the decanter 18 allowing air trapped in the decanter to escape and allowing clarified effluent to enter the decanter 18 and subsequently be discharged via the discharge conduit 40 at a flow rate substantially identical to that of the influent rate. Thus the SWD 36 remains constant throughout the fill/decant cycle segment.

When the fill/decant time ends, the computer control system 20 closes the influent control valve 26 for the just filled basin 32, and opens the influent control valve 26 for the next reactor basin 30 in sequence allowing the continuous, uninterrupted flow of wastewater to be directed to that reactor basin 30. Simultaneously, the decanter control valve 34 is opened for the just filled reactor basin 32 to fill the decanter 18 with pressurized air preventing additional mixed liquor from entering the decanter 18.

React Period

Figure 2:
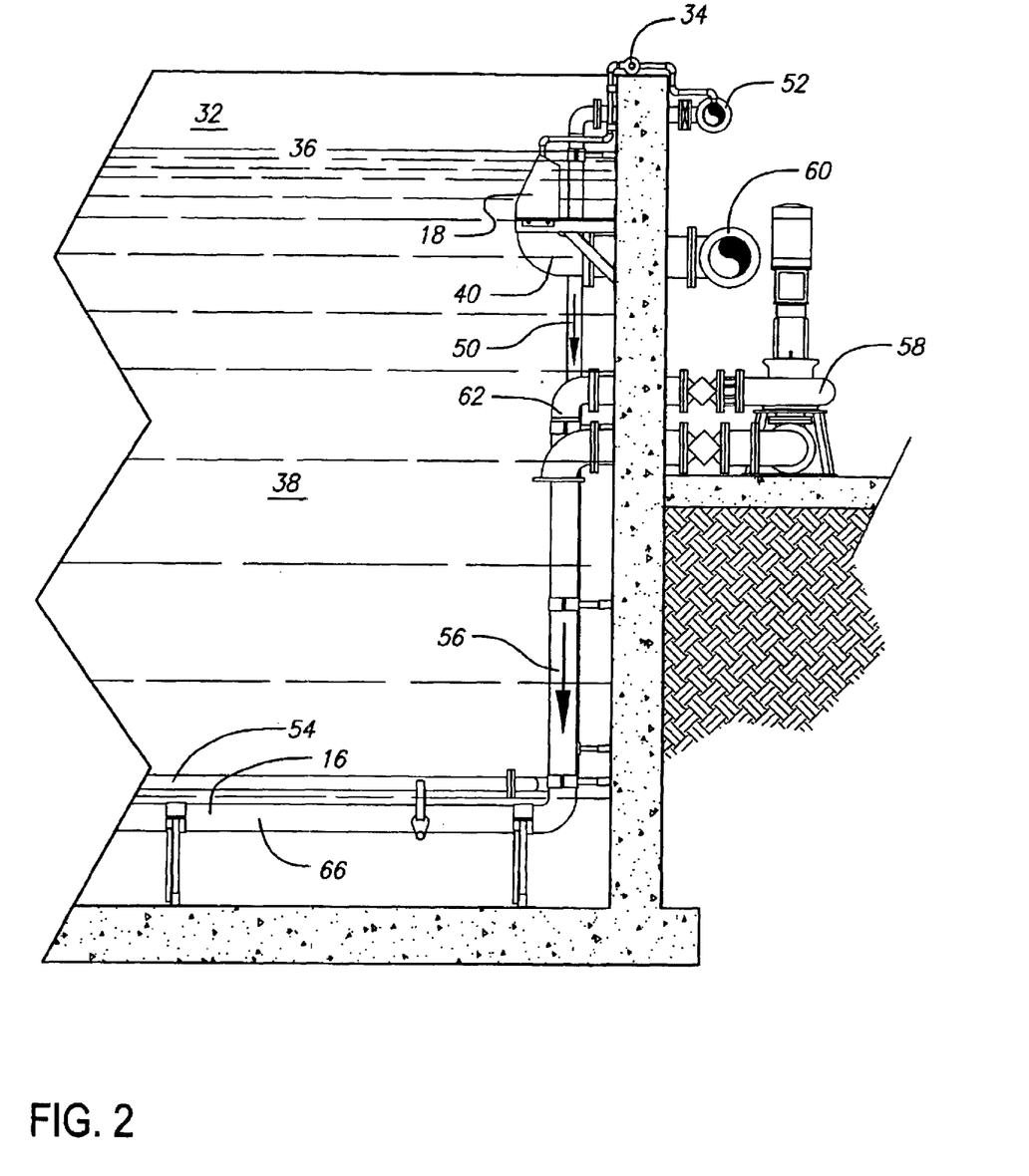
FIG. 2 is an enlarged, fragmentary and partially schematic cross-sectional view of the basin taken along line 2—2 of FIG. 1.
Figure 3:
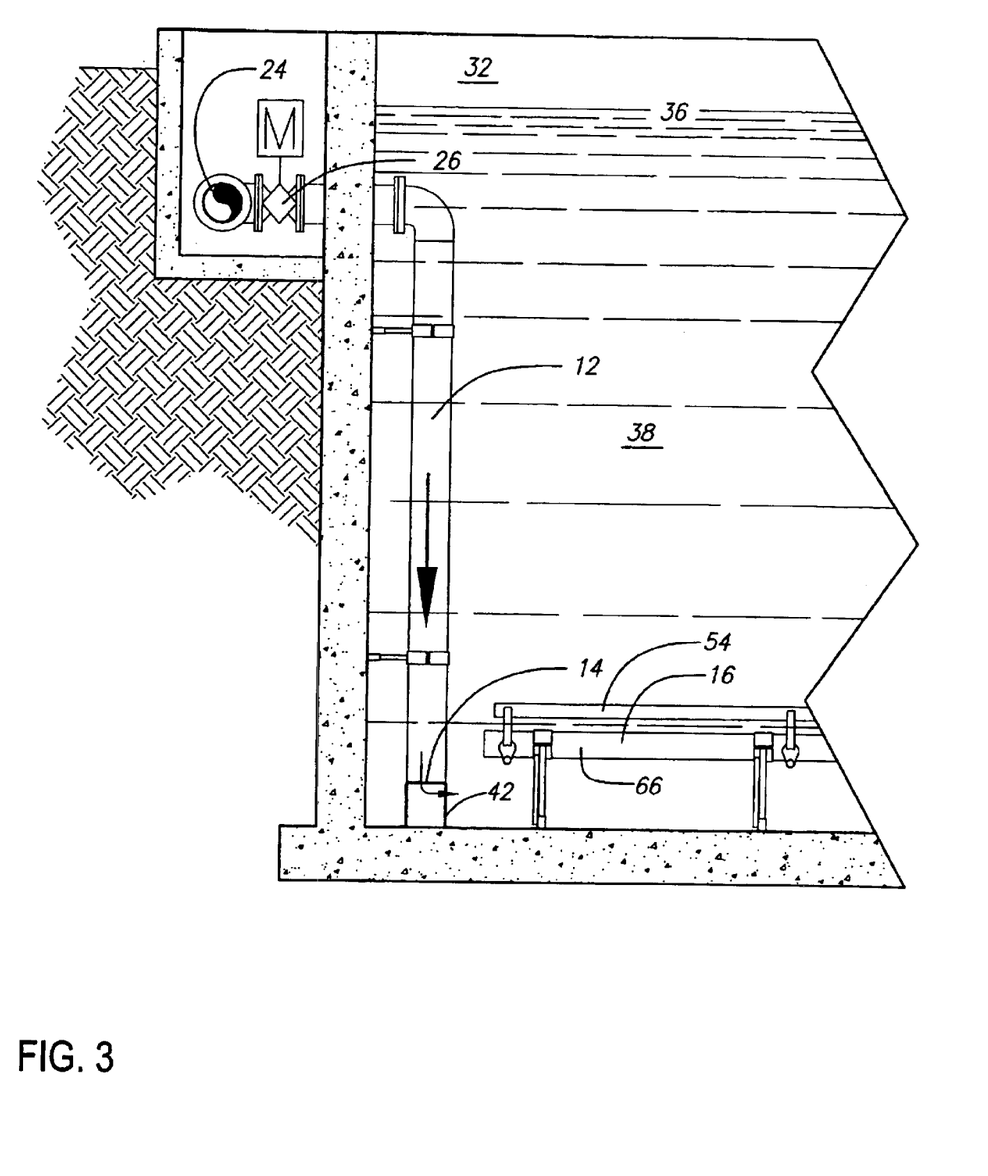
FIG. 3 is an enlarged, fragmentary and partially schematic cross-sectional view of the basin taken along line 3—3 of FIG. 1.
Figure 5:
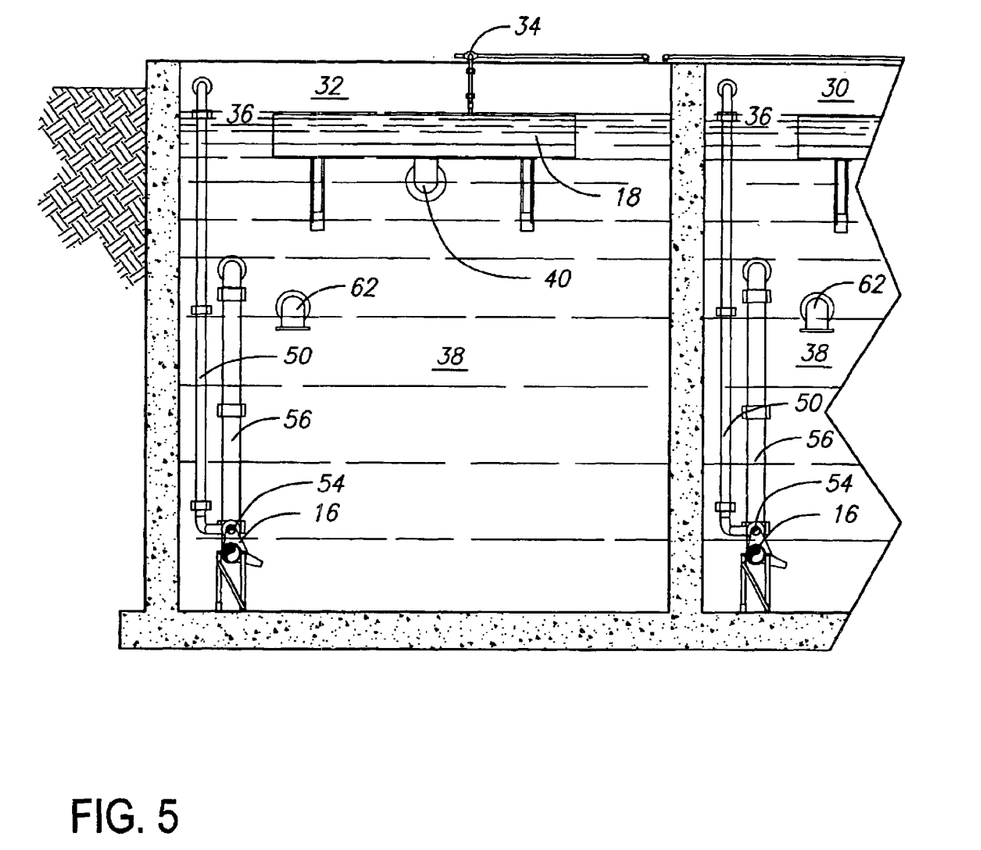
FIG. 5 is an enlarged, fragmentary and partially schematic cross-sectional view of the basin taken along line 5—5 of FIG. 1.
Figure 8:
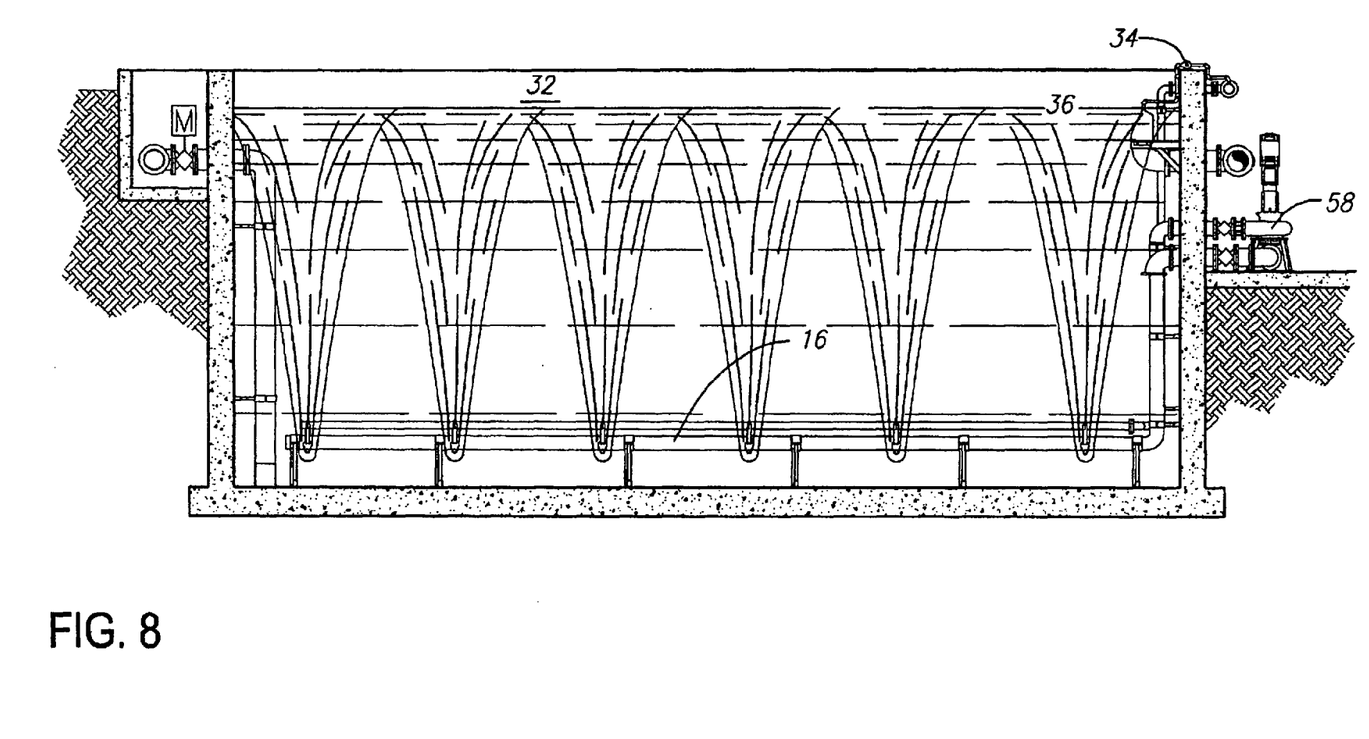
Figure 10:
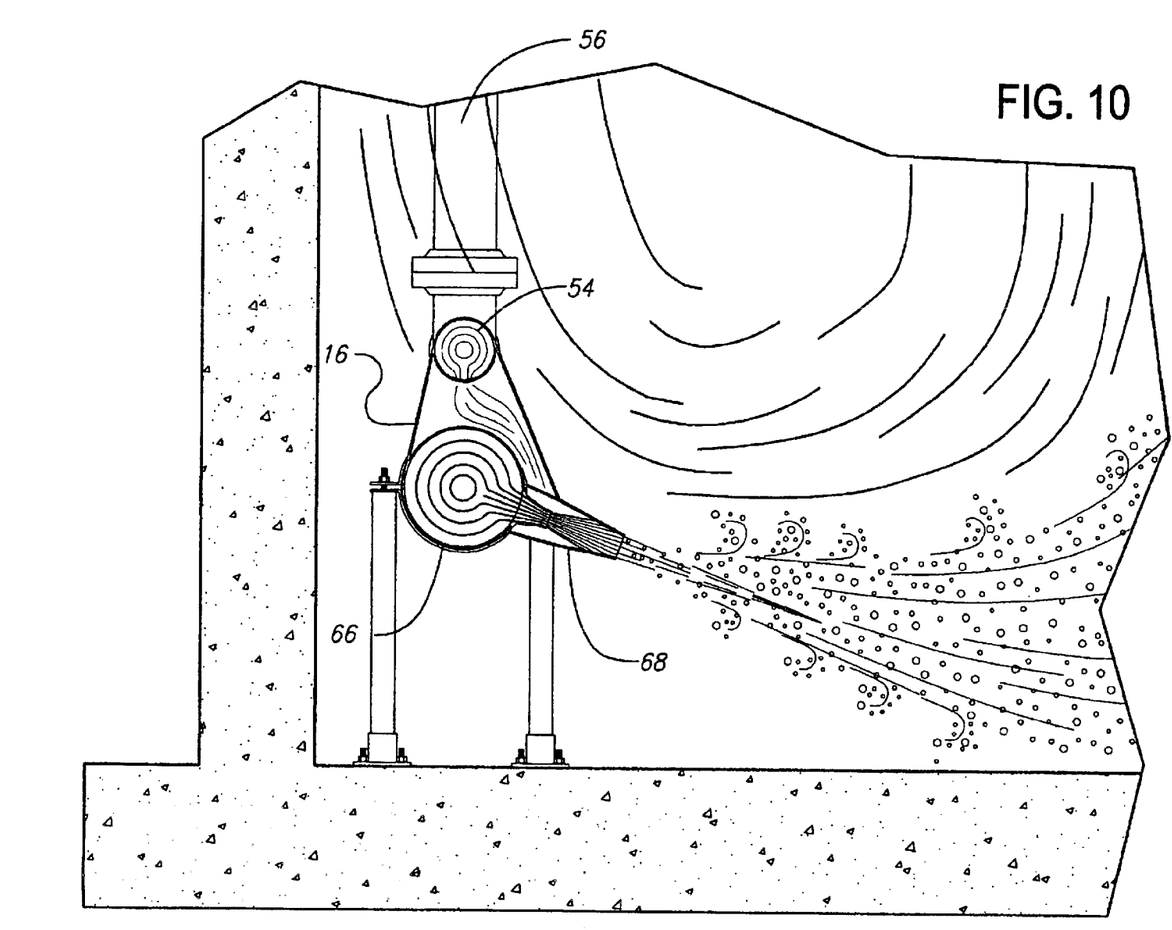
FIG. 10 is a transverse schematic section view showing a preferred embodiment of the jet aerator components.

Referring to FIGS. 8 and 10, at the end of the fill/decant period, the computer control system 20 activates the react timer for the just filled basin 32. The aeration/mixing system 16 is operated for the time period required to deliver oxygen through conduit 56 sufficient for complete biodegradation of the maximum waste materials received during the previous fill/decant cycle segment. During at least a portion of the react period, wastewater is also drawn into outlet 62 by pump 58 as best seen in FIGS. 2 and 5. The wastewater is then recirculated into each basin via conduit 56 into conduit 66 for dispersion from the jet nozzle 68 with the pressurized air.

Quiescent Period

Figure 9:
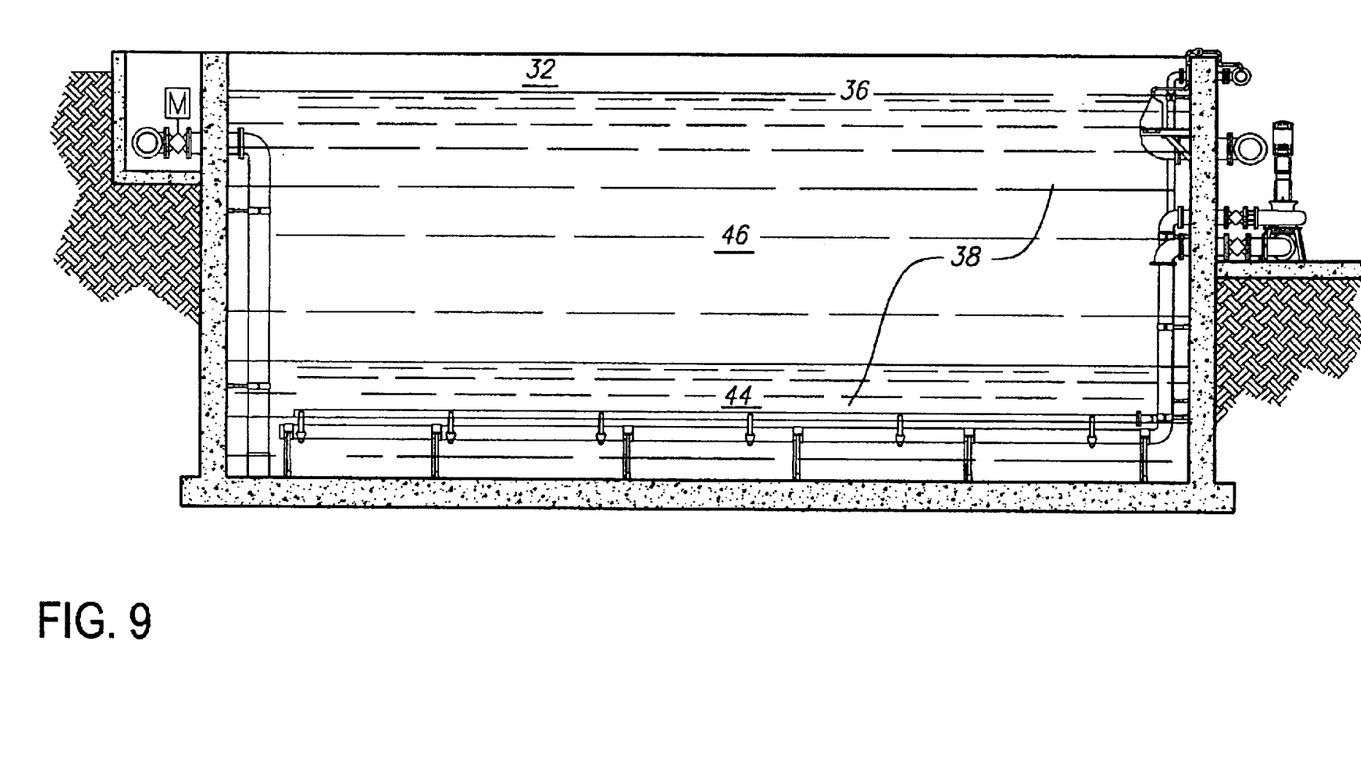

Referring to FIG. 9, at the end of the react period, the computer control system 20 ceases all aeration and mixing in the reactor basin 32 and begins the quiescent settling period. The mixed liquor 38 separates into a lower sludge layer 44, and an upper layer of clarified effluent and intermediate buffer zone 46. The reactor basin 32 remains in the quiescent settle period until the computer control system 20 initiates a new cycle.

EXAMPLE

Figure 6:
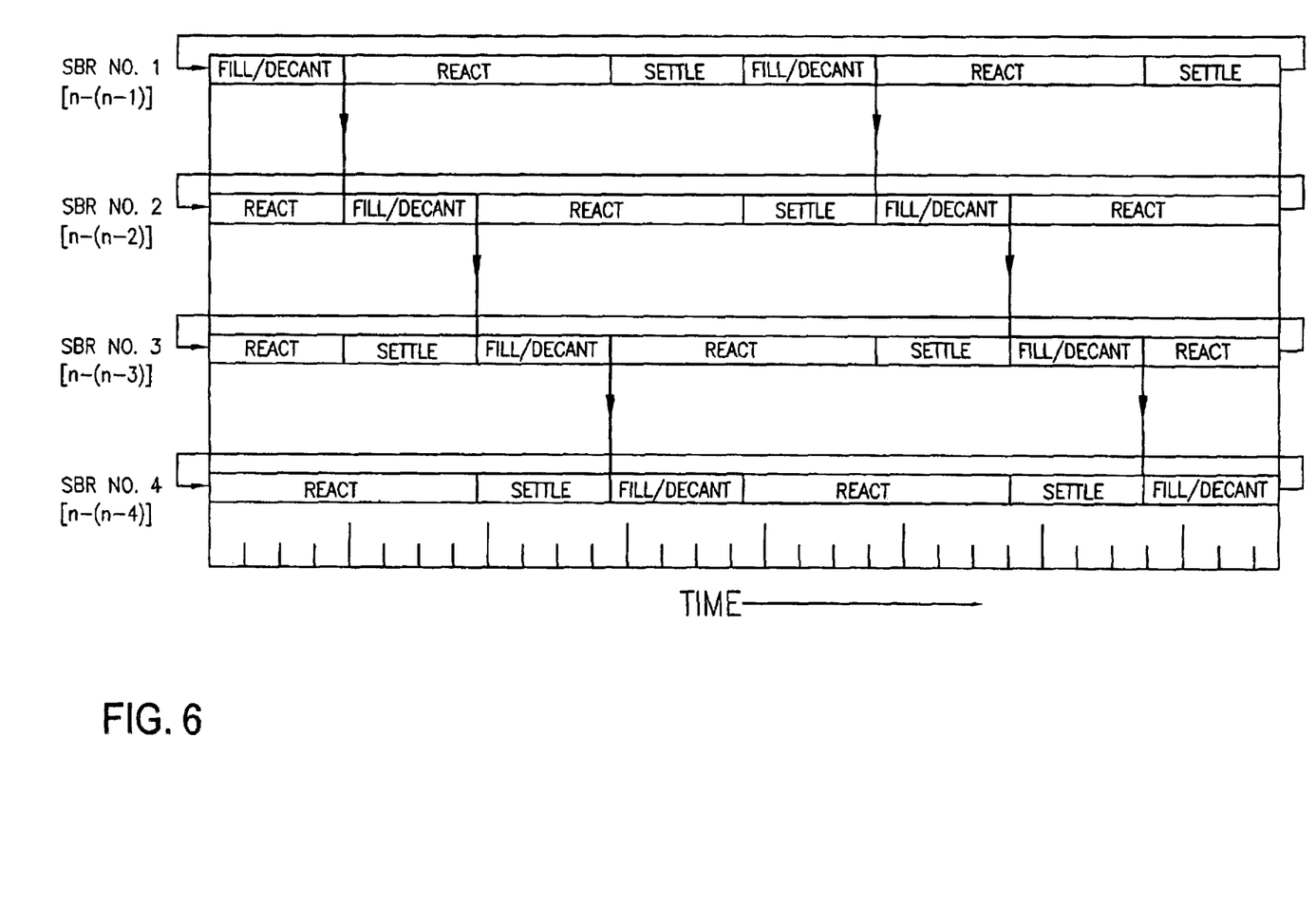
FIG. 6 is a graphical representation of an operating strategy of the present invention for a four reactor sequencing batch reactor system, as shown in the figures for a municipal wastewater treatment plant.

Referring now to FIG. 6, a graphical representation of an operating strategy in accordance with the present invention, for a sequencing batch reactor system 10 having four reactor basins for a typical 1.0 MGD municipal wastewater treatment plant. Each reactor is sized to be 77 feet long and 19 feet 3 inches wide. The SWD 36 is 22 feet. The cycle time is 3.84 hours. A full batch at the design flow rate is 40,000 gallons, or 16.4% of a single reactor basin's total volume. The fill/decant timer is set at 57.6 minutes.

Note the general designation of each of the SBRs wherein there are n numbers of SBRs, the first or No. 1 SBR being designated [n–(n–1)]. This general identification system is carried into the claims and is intended to represent the universality of this system applying to one or more SBRs wherein at least two and preferably four SBRs will carry on a continuous flow process of influent wastewater and effluent clarified water in the arrangement and sequence of fluid flow through the system as above described. This system is not intended to achieve a uniform continuous flow of influent and effluent into and from the system, respectively, but is rather intended to deal with the practical fluctuation of effluent wastewater which must be treated by such a treatment system, namely the present invention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A process for treating wastewater comprising the steps of:

A. introducing the wastewater into a sequencing batch reactor (SBR) for a preselected time period, said SBR containing a microorganism-activated sludge in a lower portion thereof and a volume of clarified effluent at a preestablished liquid level in said SBR prior to addition of the wastewater;

B. automatically causing a substantially equal volume of the clarified effluent to be decanted and discharged from said SBR during which the wastewater level in said SBR remains substantially constant;

C. mixing the wastewater with the sludge and aerating the wastewater in the SBR, the wastewater being aerated for a selected period of time or until a desired level of wastewater treatment is reached and the microorganisms are viable;

D. allowing the aerated wastewater to settle and separate into an upper layer of clarified effluent and a lower layer of sludge after which step A is repeated.

2. A process for the treatment of wastewater in a sequencing batch reactor system including first and second adjacent sequencing batch reactors (SBR) each of which sequentially receive influent wastewater for substantially equal predetermined time periods, wherein the wastewater is introduced into the system at steady or continuous varying flowing rates, said Process comprising:

A. introducing influent wastewater into said first SBR for the predetermined time period, said first SBR containing microorganism-activated sludge and a volume of clarified effluent at a predetermined liquid level;

B. redirecting the influent wastewater into said second SBR for the predetermined time period, said second SBR also containing microorganism-activated sludge and a volume of clarified effluent at a predetermined liquid level;

C. simultaneously with step A, decanting clarified effluent from said first SBR at a variable outlet rate substantially equal to the flow rate of the incoming flow of wastewater into said first SBR after step A whereby the predetermined liquid level in said first SBR is substantially maintained;

D. simultaneously with step B, decanting clarified effluent from said second SBR at a variable outlet rate substantially equal to the flow rate of the incoming flow of wastewater into said second SBR whereby the predetermined liquid level in said second SBR is also substantially maintained;

E. after Step A, aerating the wastewater in said first SBR for a second selected period while mixing the wastewater with the sludge after the incoming wastewater flow has been diverted to said second SBR;

F. after Step D, aerating the wastewater in said second SBR for the second selected period while mixing the wastewater with the activated sludge after the incoming wastewater flow has been diverted back to said first SBR;

G. after Step E, allowing the wastewater in said first SBR to settle into an upper layer of clarified effluent and a lower layer of sludge;

H. after Step F, allowing the wastewater in said second SBR to settle into an upper layer of clarified effluent and a lower layer of sludge;

I. repeat Steps A to H.

3. A process for the treatment of wastewater using microorganisms in a system including operably separate, substantially similar sequencing batch reactors (SBR)s wherein wastewater is introduced into each of (n) said SBRs sequentially at varying substantially uninterrupted flow rates, said Process comprising the steps of:

A. determining a maximum operating cycle time period for each said SBR to complete a cyclical process of treating wastewater, said maximum operating cycle time period including a maximum influent wastewater fill time period for each said SBR equal to the maximum operating cycle time period divided by the number (n) of SBRs in said system;

B. determining a maximum reaction time period during the maximum operating time period required for aerating and mixing the wastewater with sludge and microorganisms in the lower portion of said SBR immediately after the fill time period, the aeration being for a time period during the reactor time period sufficient to maintain a viable microorganism population in the sludge;

C. determining a quiescent time period during the maximum operating time period for the aerated wastewater in each said SBR to settle into a lower sludge layer and an upper clarified effluent layer;

D. for the fill time period, directing a stream of influent wastewater into one said SBR sequentially numbered [n–(n–1)] containing the lower sludge layer and the upper clarified effluent layer, said stream of influent wastewater displacing an equal volume of clarified effluent which is discharged from said first reactor by a decanting mechanism whereby the wastewater level in said SBR numbered [n–(n–1)] remains substantially constant throughout each operating cycle;

E. for the fill time period, directing a stream of influent wastewater into one said SBR numbered [n–(n–2)] while simultaneously aerating and mixing said wastewater in said SBR numbered [n–(n–1)] for the reaction time period;

F. for the quiescent time period, (i) initiating quiescence in said reactor numbered [n–(n–1)] wherein quiescent conditions are maintained therein allowing the aerated wastewater to settle into a lower sludge layer and an upper clarified effluent layer while simultaneously (ii) repeating step E in said SBR numbered [n–(n–2)] for said reaction time period and (iii) repeating Step D with respect to said SBR numbered [n–(n–3)];

G. repeat steps D to F with respect to said SBRs numbered [n–(n–2)] to [n–(n–n)].

4. A system for the treatment of wastewater using microorganisms wherein wastewater is introduced into said system at varying substantially uninterrupted flow rates, comprising:

a plurality (n) of separate adjacent sequencing batch reactors (SBR) each including:
a reactor basin for holding a quantity of wastewater and having a substantially open upper end thereof;

an influent conduit selectively receiving influent wastewater from an inlet manifold and distributing the influent wastewater into the bottom portion of said reactor basin;

an aerating member extending above the bottom of said reactor basin for introducing pressurized air or oxygen into microorganism-activated sludge positioned in the bottom portion of said reactor basin;

a wastewater and sludge mixing member positioned in said reactor basin and having a pumping means adapted to circulate and mix the sludge and wastewater in said reactor basin together whereby microorganisms in the sludge purify the wastewater;

a decanting member positioned at a fixed height in and above the bottom of said basin which establishes a constant liquid level in said reactor basin, said decanting member adapted to remove clarified or treated wastewater as an effluent from the upper most portion of said reactor basin;

a controller operably connected to each SBR for:

i. determining a maximum operating cycle time period for each said SBR to complete a cyclical process of treating wastewater, said maximum operating cycle time period including a maximum influent wastewater fill time period for each said SBR equal to the maximum operating cycle time period divided by the number (n) of SBRs in said system;

ii. determining a maximum reaction time period during the maximum operating time period required for aerating and mixing the wastewater with sludge and microorganisms in the lower portion of said SBR immediately after the fill time period, the aeration being for a time period during the reactor time period sufficient to maintain a viable microorganism population in the sludge;

iii. determining a quiescent time period during the maximum operating time period for the aerated wastewater in each said SBR to settle into a lower sludge layer and an upper clarified effluent layer;

iv. for the fill time period, directing a stream of influent wastewater into said reactor basin sequentially numbered [n–(n–1)] through said inlet manifold and said influent conduit and containing the lower sludge layer and the upper clarified effluent layer, said stream of influent wastewater displacing an equal volume of clarified effluent which is discharged from said first reactor basin by a decanting mechanism whereby the wastewater level in said SBR numbered [n–(n–1)] remains substantially constant throughout each operating cycle;

v. for the fill time period, directing a stream of influent wastewater into said SBR numbered [n–(n–2)] while substantially simultaneously aerating and mixing said wastewater in said SBR numbered [n–(n–1)] for the reaction time period;

vi. for the quiescent time period, initiating quiescence in said reactor numbered [n–(n–1)] whereby quiescent conditions are maintained therein allowing the aerated wastewater to settle into a lower sludge layer and an upper clarified effluent layer while substantially simultaneously repeating v in said SBR numbered [n–(n–2)] for said reaction time period and repeating iv for said SBR numbered [n–(n–3)];

vii. repeating iv through vi sequentially for SBRs numbered (n–2) to [n–(n–n)].

* * * * *